United States Patent Office 2,926,186
Patented Feb. 23, 1960

2,926,186

PURIFICATION OF TRIMETHOXYBOROXINE

William H. Schechter and Thomas B. Williams, Zelienople, Pa., assignors, by direct and mesne assignments, to Callery Chemical Company, Pittsburgh, Pa., a corporation of Pennsylvania No Drawing. Application October 20, 1955
Serial No. 541,860

4 Claims. (Cl. 260—462)

This invention relates to a new and useful method for purifying trimethoxyboroxine, $B_3O_3(OCH_3)_3$. In particular, it relates to a method for removing hydroxyl impurities from crude trimethoxyboroxine.

There are several known methods for preparing trimethoxyboroxine. One of these methods involves the heating of equimolar quantities of boric oxide and trimethyl borate, $B(OCH_3)_3$, in a closed bomb. Another method involves the partial hydrolysis of trimethyl borate itself. A third method of preparation is the reaction of boric oxide with trimethyl borate-methanol azeotrope. All these methods result in the formation of crude trimethoxyboroxine containing hydroxyl impurities. The exact nature of these hydroxyl impurities is not known but they are associated with the trimethoxyboroxine in such a manner that some driving force such as heat is necessary to volatilize them out in the form of methanol. Salting out is not a sufficient driving force to remove these objectionable hydroxyl groups. Trimethoxyboroxine is an important intermediate in the preparation of dimethoxyborane, $HB(OCH_3)_2$, and diborane, $B_2H_6$. It has, therefore, become important to find a convenient and simple method for removing the hydroxyl impurities contained in crude trimethoxyboroxine in order to reduce the active hydrogen loss which results upon further reaction with sodium borohydride to form dimethoxyborane.

It is one object of this invention to provide a simple and economical method for purifying crude trimethoxyboroxine.

Another object is to provide a new and useful method for removing hydroxyl impurities found in crude trimethoxyboroxine.

Other objects will appear from time to time throughout the following specification and appended claims.

This new and improved method for purifying trimethoxyboroxine will be more fully described hereinafter and the novelty thereof will be particularly pointed out and distinctly claimed.

This invention is based upon the discovery that crude trimethoxyboroxine can be purified by refluxing the same with trimethyl borate, filtering off a hydroxyl containing precipitate, adding hexane to the filtrate and fractionally distilling the resulting mixture. Hexane-methanol azeotrope, hexane-trimethyl borate azeotrope and trimethyl borate are successively distilled leaving substantially pure trimethoxyboroxine in the distillation flask.

In one experiment, 500 ml. of crude trimethoxyboroxine containing 1 mmol of hydroxyl per ml. and 200 ml. of trimethyl borate were placed in a suitable round-bottom flask to which was attached a 20 plate distillation column packed with glass helices. The mixture was refluxed for about 30 minutes during which time a white precipitate formed and slowly settled to the bottom of the reaction flask. This precipitate containing the major portion of the hydroxyl impurities was filtered off and the filtrate was fractionally distilled while adding 400 ml. of n-hexane incrementwise from the top of the distillation column. The hexane thus added formed an azeotrope with both the trimethyl borate present and the methanol formed. Upon removal of these azeotropes from the top of the column, the purified trimethoxyboroxine remained in the distilling flask. Infra-red analysis of the liquid remaining showed that the hydroxyl content had been reduced to .01 mmol per ml.

In other experiments using the same procedure, samples of trimethoxyboroxine containing 1 mmol or more of hydroxyl per ml. were purified and the hydroxyl content reduced to as low a value as .003 mmol per ml. In these experiments it was found that n-hexane, isomeric hexanes such as 2,3 dimethyl butane or mixtures thereof could be used satisfactorily as the azeotrope forming reagent.

Having thus described the best mode of operating this invention as required by the patent statutes, it should be understood that within the scope of the appended claims this invention may be practiced otherwise than as specifically described.

What is desired to be claimed and secured by United States patent is:

1. A method of purifying crude trimethoxyboroxine containing hydroxyl impurities which comprises refluxing said crude trimethoxyboroxine with trimethyl borate, filtering off the hydroxyl containing precipitate formed, fractionally distilling the resulting filtrate in the presence of a hexane to successively remove a hexane-methanol azeotrope, hexane-trimethyl borate azeotrope and trimethyl borate leaving susbtantially pure trimethoxyboroxine as a residue.

2. A method according to claim 1 in which sufficient hexane is present to form an azeotropic mixture with all of the trimethyl borate present and all of the methanol formed by the reaction.

3. A method according to claim 1 in which the hexane used is n-hexane.

4. A method according to claim 1 in which the hexane used is 2,3 dimethyl butane.

References Cited in the file of this patent

Goubeau et al.: "Z. anorg. U. allgem. Chem." 267, pp. 1–26 (1951), (pp. 5–6 pertinent). Copy in Patent Office Library.